US012037504B2

(12) United States Patent
Kaida et al.

(10) Patent No.: US 12,037,504 B2
(45) Date of Patent: Jul. 16, 2024

(54) DECORATIVE MATERIAL, MANUFACTURING METHOD OF DECORATIVE MATERIAL, LAMINATED BODY USING DECORATIVE MATERIAL

(71) Applicant: DAI NIPPON PRINTING CO., LTD., Tokyo (JP)

(72) Inventors: Takafumi Kaida, Sagamihara (JP); Yuki Aoyama, Odawara (JP); Ryouichi Satou, Aikawa-machi (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/917,447

(22) PCT Filed: Apr. 23, 2021

(86) PCT No.: PCT/JP2021/016389
§ 371 (c)(1),
(2) Date: Oct. 6, 2022

(87) PCT Pub. No.: WO2021/220946
PCT Pub. Date: Nov. 4, 2021

(65) Prior Publication Data
US 2023/0183511 A1    Jun. 15, 2023

(30) Foreign Application Priority Data

Apr. 27, 2020 (JP) ................................ 2020-078507

(51) Int. Cl.
*C09D 11/50* (2014.01)
*B41M 5/00* (2006.01)
(Continued)

(52) U.S. Cl.
CPC ........... *C09D 11/50* (2013.01); *B41M 5/0058* (2013.01); *C09D 11/033* (2013.01);
(Continued)

(58) Field of Classification Search
CPC ...................................................... E04F 13/123
See application file for complete search history.

(56) References Cited

FOREIGN PATENT DOCUMENTS

JP    S55-148106 U    10/1980
JP    S57-70863 U     4/1982
(Continued)

OTHER PUBLICATIONS

Jul. 6, 2021 Search Report issued in International Patent Application No. PCT/JP2021/016389.

*Primary Examiner* — Ian A Rummel
(74) *Attorney, Agent, or Firm* — Oliff PLC

(57) ABSTRACT

A decorative material is designed with excellent visual effect and a bright pattern layer on a base material, wherein the layer has at least a first and second bright ink layer, the first and second bright ink layer satisfy the following relationship (A) or (B), each bright ink layer is provided on at least part of the base material when the decorative material is viewed in a plan view, and the first layer has a region overlapping and a region that not overlapping the second layer, and the second layer has a region overlapping and a region not overlapping the first layer. (A) The first bright ink layer contains a first bright pigment, and the second bright ink layer contains a different second bright pigment. (B) The first and second bright ink layer contain bright pigments, and the first layer pigment content is different from the second layer pigment content.

15 Claims, 5 Drawing Sheets

(51) Int. Cl.
*C09D 11/033* (2014.01)
*C09D 11/037* (2014.01)
*C09D 11/104* (2014.01)
*C09D 11/54* (2014.01)
*E04F 13/08* (2006.01)
*E04F 13/12* (2006.01)

(52) U.S. Cl.
CPC .......... *C09D 11/037* (2013.01); *C09D 11/104* (2013.01); *C09D 11/54* (2013.01); *E04F 13/0871* (2013.01); *E04F 13/123* (2013.01)

(56) References Cited

FOREIGN PATENT DOCUMENTS

| | | | |
|---|---|---|---|
| JP | H04-238030 A | | 8/1992 |
| JP | H10-216625 A | | 8/1998 |
| JP | H10-305509 A | | 11/1998 |
| JP | 2002-103777 A | | 4/2002 |
| JP | 2003-246017 A | | 9/2003 |
| JP | 2003246017 A | * | 9/2003 |
| JP | 2014-148058 A | | 8/2014 |
| JP | 2017-77697 A | | 4/2017 |
| JP | 2018-43428 A | | 3/2018 |
| JP | 2020-033109 A | | 3/2020 |
| WO | 2008/129667 A1 | | 10/2008 |

* cited by examiner

[Fig. 1]
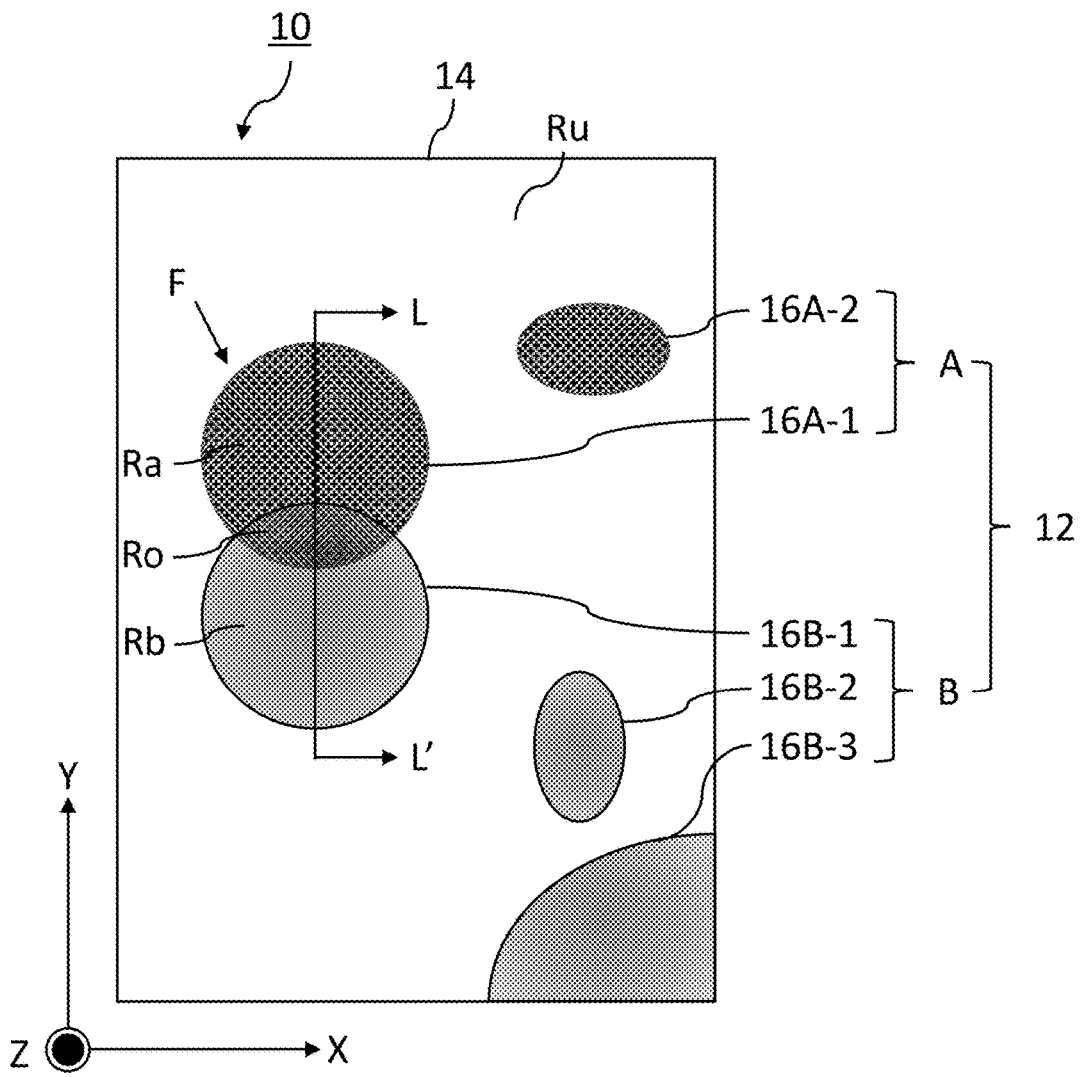
[Fig. 2]
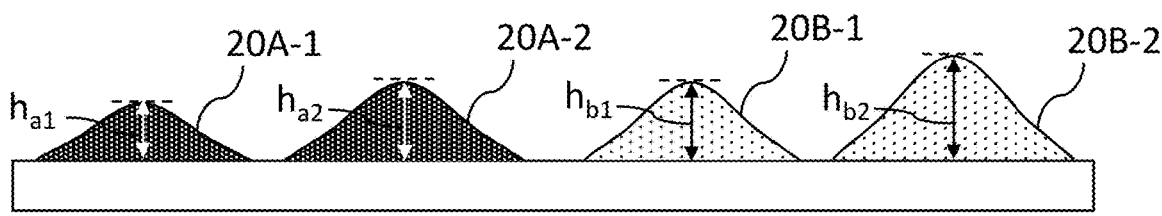

[Fig. 3]
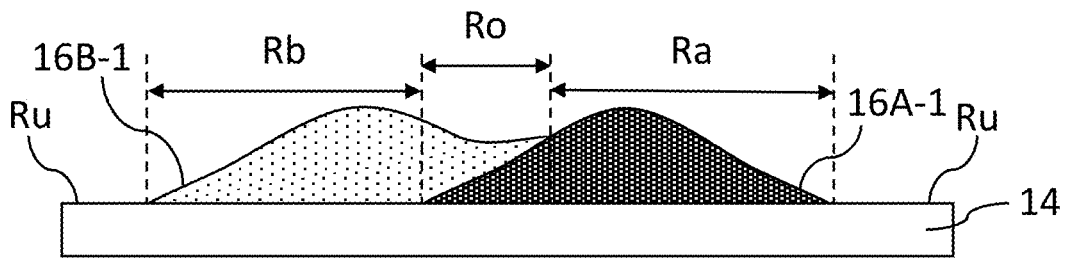
[Fig. 4]
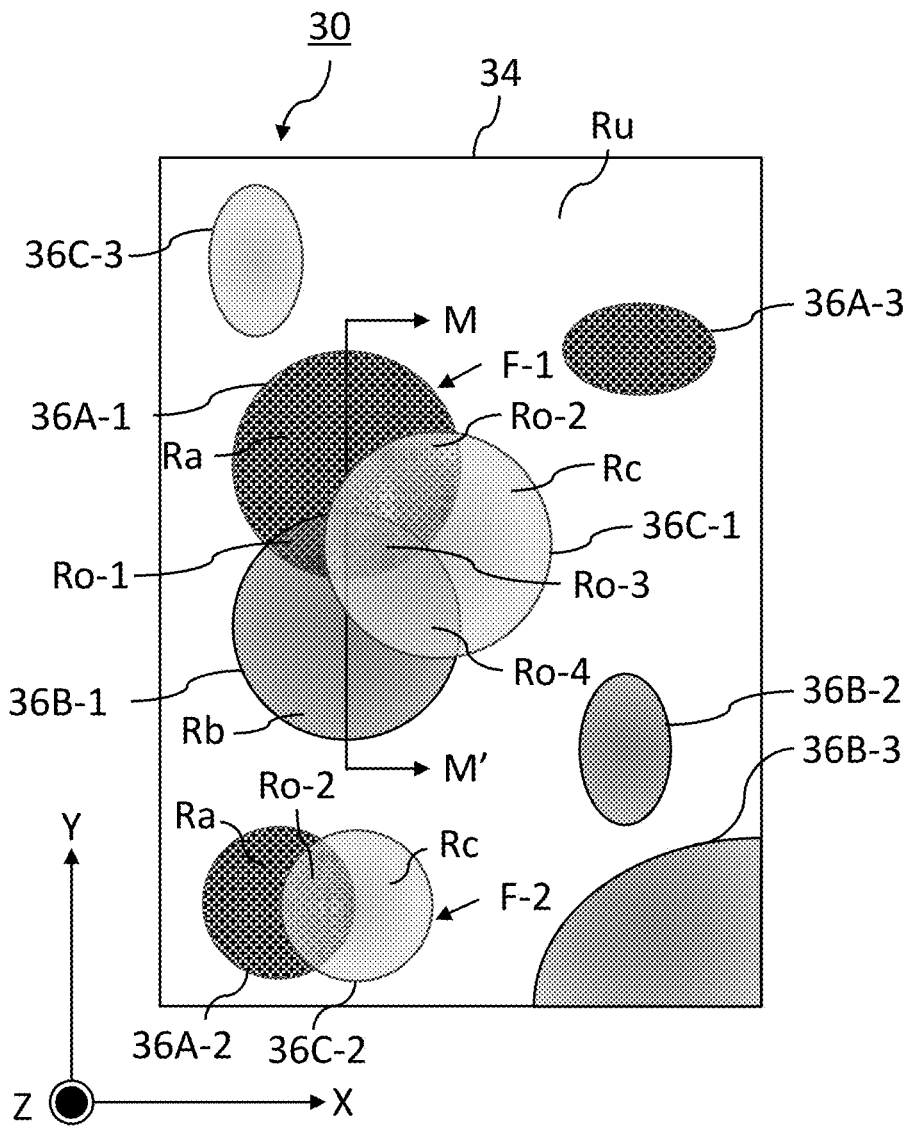

[Fig. 5]
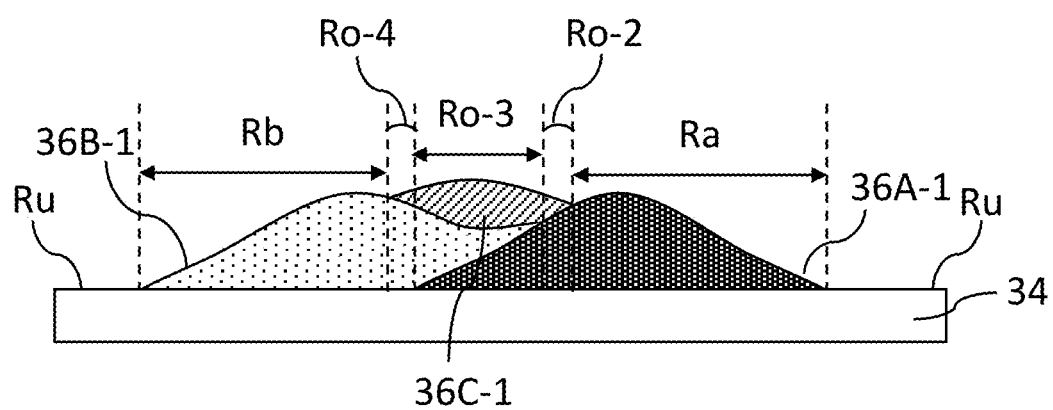

[Fig. 6]
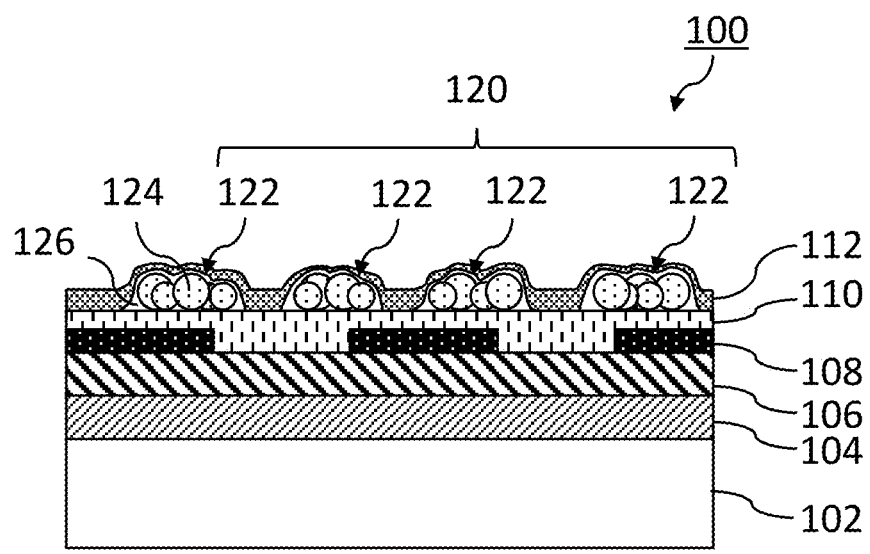

[Fig. 7]
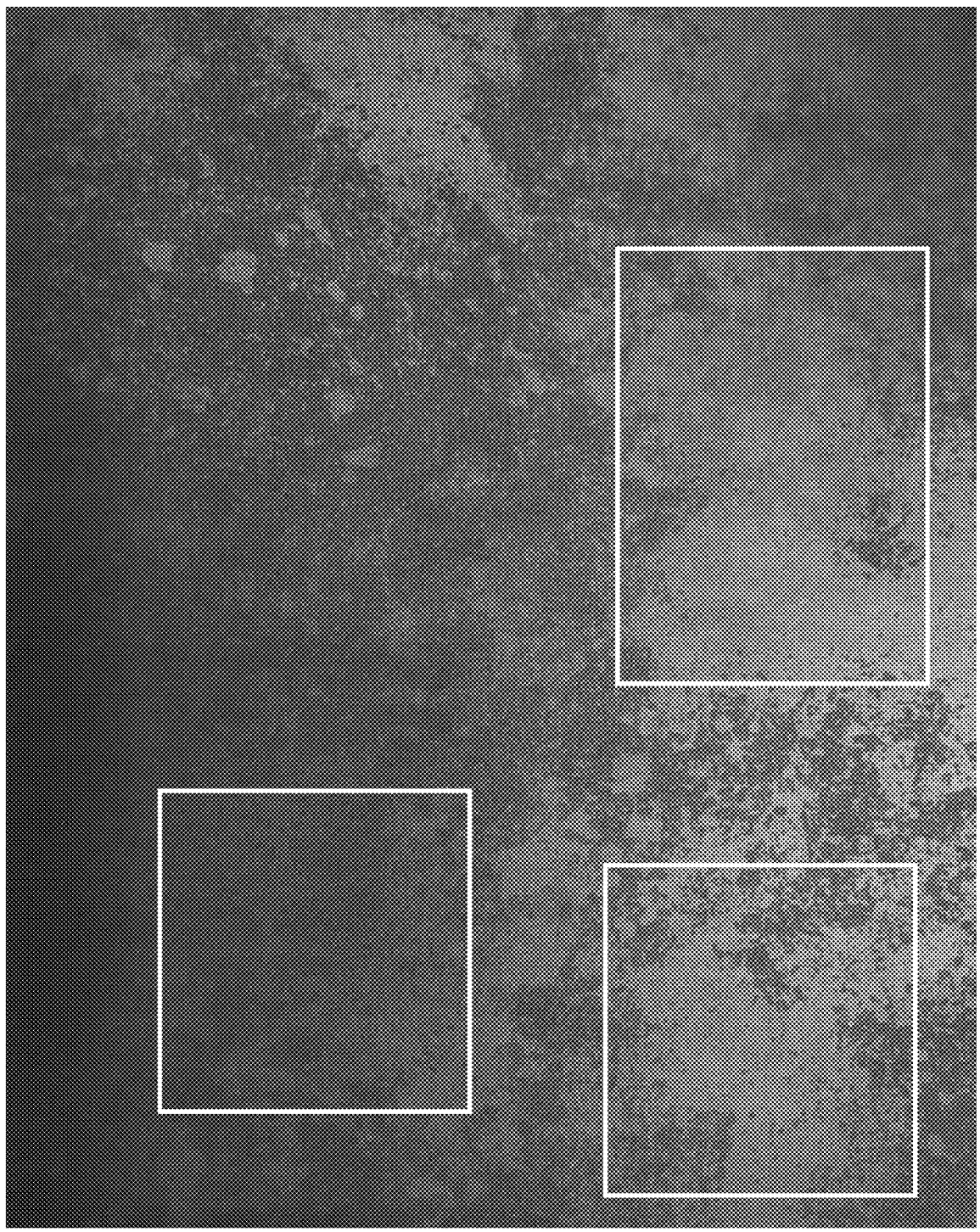

DECORATIVE MATERIAL, MANUFACTURING METHOD OF DECORATIVE MATERIAL, LAMINATED BODY USING DECORATIVE MATERIAL

TECHNICAL FIELD

The present disclosure relates to a decorative material, a method of producing the decorative material, and a laminate using the decorative material.

BACKGROUND ART

Decorative materials are widely used for surface decoration such as building interiors, construction materials, furniture, fittings, building materials, vehicles, home appliances, bathroom products including modular baths, and kitchen products. Such a decorative material includes an adherend base material to which paper or a resin sheet printed with a picture pattern is attached, and a metal plate such as a steel plate with a picture pattern formed by printing on its surface.

In such a decorative material, by providing a coating layer containing a bright pigment typified by a pearl pigment, a design that causes a change in the appearance color depending on viewing angles and the amount of light is imparted. For example, PTL 1 discloses a decorative sheet in which the color and texture of a pattern are changed by providing a coating layer containing a pearl pigment and a printing layer (picture pattern) on a white base material.

CITATION LIST

Patent Literature

PTL 1: JP 2014-148058 A

SUMMARY OF INVENTION

Technical Problem

In recent years, with the growing preference of consumers for luxury or various needs, it is required to be able to reproduce a high-class design and an appearance close to a real material. However, the decorative sheet of PTL 1 is a single-layer coating layer, and the color change due to the amount of light is monotonous. Therefore, there has been a limit in imparting high design properties with an excellent visual effect.

It is an object of the present disclosure to provide a decorative material having a design with an excellent visual effect.

Solution to Problem

In order to solve the aforementioned problems, the present disclosure provides [1] to [17] below.

[1] A decorative material having a bright pattern layer on a base material, wherein
the bright pattern layer has at least a first bright ink layer and a second bright ink layer,
the first bright ink layer and the second bright ink layer satisfy the following relationship (A) or (B),
each of the bright ink layers is provided on at least a part of the base material when the decorative material is viewed in a plan view,
when the decorative material is viewed in a plan view, the first bright ink layer has a region that overlaps and a region that does not overlap with the second bright ink layer, and the second bright ink layer has a region that overlaps and a region that does not overlap with the first bright ink layer.

(A) The first bright ink layer contains a first bright pigment, and the second bright ink layer contains a second bright pigment different from the first bright pigment.

(B) The first bright ink layer and the second bright ink layer contain a bright pigment, and a content of the bright pigment in the first bright ink layer is different from a content of the bright pigment in the second bright ink layer.

[2] The decorative material according to [1], wherein, when the decorative material is viewed in a plan view, the first bright ink layer is composed of an aggregate of a plurality of independent regions, and when maximum film thicknesses of the respective independent regions are compared, the maximum film thickness of at least one independent region is different from the maximum film thickness of the other independent regions.

[3] The decorative material according to [1], wherein, when the decorative material is viewed in a plan view, the first bright ink layer is composed of an aggregate of a plurality of independent regions, and at least one or more of the independent regions are partially different in film thickness within the independent regions.

[4] The decorative material according to [3], wherein at least one or more of the independent regions of the first bright ink layer have a film thickness distribution in a range of 0.15 μm to 6.0 μm within the independent regions.

[5] The decorative material according to [1], wherein, when the decorative material is viewed in a plan view, the second bright ink layer is composed of an aggregate of a plurality of independent regions, and when maximum film thicknesses of the respective independent regions are compared, the maximum film thickness of at least one independent region is different from the maximum film thickness of the other independent regions.

[6] The decorative material according to [1], wherein, when the decorative material is viewed in a plan view, the second bright ink layer is composed of an aggregate of a plurality of independent regions, and at least one or more of the independent regions are partially different in film thickness within the independent regions.

[7] The decorative material according to [6], wherein at least one or more of the independent regions of the second bright ink layer have a film thickness distribution in a range of 0.15 μm to 6.0 μm within the independent regions.

[8] The decorative material according to any one of [1] to [7], wherein at least one of the film thickness of the first bright ink layer and the film thickness of the second bright ink layer in the region where the first bright ink layer and the second bright ink layer overlap is partially different.

[9] The decorative material according to any one of [1] to [8], wherein the first bright ink layer and the second bright ink layer satisfy the relationship (A), and the first bright pigment and the second bright pigment are different in at least one of reflection characteristics selected from a luminous reflectance Y value, a spectral reflectance, an L* value, an a* value and a b* value.

[10] The decorative material according to any one of [1] to [9], wherein a base coating layer is further provided between the base material and the bright pattern layer, and the base coating layer is a monochromatic or colorless layer.

[11] The decorative material according to any one of [1] to [10], wherein a heaping layer is provided on a part of the bright pattern layer.

[12] The decorative material according to any one of [1] to [11], wherein the base material is a metal base material.

[13] A laminate including an adherend, and the decorative material according to any one of [1] to [12] that is laminated on the adherend.

[14] A method of producing a decorative material, including a step of forming a bright pattern layer on a base material, wherein
the bright pattern layer has at least a first bright ink layer and a second bright ink layer,
the first bright ink layer and the second bright ink layer satisfy the following relationship (A) or (B),
each of the bright ink layers is provided on at least a part of the base material when the decorative material is viewed in a plan view,
when the decorative material is viewed in a plan view, the first bright ink layer has a region that overlaps and a region that does not overlap with the second bright ink layer, and the second bright ink layer has a region that overlaps and a region that does not overlap with the first bright ink layer.
(A) The first bright ink layer contains a first bright pigment, and the second bright ink layer contains a second bright pigment different from the first bright pigment.
(B) The first bright ink layer and the second bright ink layer contain a bright pigment, and a content ratio of the bright pigment in the first bright ink layer is different from a content ratio of the bright pigment in the second bright ink layer.

[15] The method of producing a decorative material according to [14], wherein the bright pattern layer is formed by a step of applying and drying an ink for the first bright ink layer on the base material and a step of applying and drying an ink for the second bright ink layer on the base material.

[16] The method of producing a decorative material according to [14], wherein the bright pattern layer is formed by a step of transferring a transfer layer of a transfer sheet having the transfer layer including the bright pattern layer on a release layer to the base material.

[17] The method of producing a decorative material according to any one of [14] to [16], wherein the base material is a metal base material.

Advantageous Effects of Invention

According to the present disclosure, a decorative material having a design with an excellent visual effect can be obtained.

BRIEF DESCRIPTION OF DRAWINGS

FIG. 1 is a schematic plan view for explaining a decorative material according to an embodiment of the present disclosure.

FIG. 2 is a schematic plan view for explaining a decorative material according to another embodiment of the present disclosure.

FIG. 3 is a diagram for explaining a cross-sectional shape of a bright ink layer in the present disclosure.

FIG. 4 is a diagram for explaining an example of a laminated state of bright ink layers in the present disclosure.

FIG. 5 is a diagram for explaining another example of a laminated state of bright ink layers in the present disclosure.

FIG. 6 is a schematic cross-sectional view of a decorative material according to an embodiment of the present disclosure.

FIG. 7 is an external view of a decorative material of Example 1.

DESCRIPTION OF EMBODIMENTS

Hereinafter, the decorative material of the present disclosure will be described in detail. The notation of the numerical range of "AA to BB" in the present description means "AA or more and BB or less".

[Decorative Material]

The decorative material of the present disclosure is a decorative material having a bright pattern layer on a base material, wherein the bright pattern layer has at least a first bright ink layer and a second bright ink layer, the first bright ink layer and the second bright ink layer satisfy the following relationship (A) or (B), each of the bright ink layers is provided on at least a part of the base material when the decorative material is viewed in a plan view, when the decorative material is viewed in a plan view, the first bright ink layer has a region that overlaps and a region that does not overlap with the second bright ink layer, and the second bright ink layer has a region that overlaps and a region that does not overlap with the first bright ink layer.

(A) The first bright ink layer contains a first bright pigment, and the second bright ink layer contains a second bright pigment different from the first bright pigment.

(B) The first bright ink layer and the second bright ink layer contain a bright pigment, and the content of the bright pigment in the first bright ink layer is different from the content of the bright pigment in the second bright ink layer.

First, the visual effect of the decorative material of the present disclosure will be described.

FIG. 1 is a schematic plan view for explaining a decorative material according to an embodiment of the present disclosure. In the present disclosure, the "plan view" means that the decorative material of the present disclosure is visually recognized in the plane direction from the surface side (front side) on which the bright pattern layer is provided. For example, in the XYZ coordinate system shown in FIG. 1, the planes represented by the X-axis direction and the Y-axis direction coincide with the surface of the decorative material, and the "plan view" corresponds to viewing the surface of the decorative material from the Z-axis direction.

In a decorative material 10 of FIG. 1, when viewed from the surface side, it is possible to visually recognize a pattern (picture) formed by a bright pattern layer 12 and a region Ru in which the base of the bright pattern layer can be visually recognized (corresponding to the base material or base coating layer described later, hereinafter referred to as "base region"). In the present disclosure, the bright pattern layer is composed of at least two types of bright ink layers.

The at least two types of bright ink layers include at least a first bright ink layer and a second bright ink layer. The first bright ink layer and the second bright ink layer satisfy the relationship (A) or (B).

The first bright ink layer and the second bright ink layer may satisfy one of the relationships (A) and (B), and may also satisfy both (A) and (B).

In the present description, various embodiments may be described separately with respect to embodiments of the bright ink layer (for example, an embodiment of (A) and an embodiment of (B) may be described separately. Further, an embodiment of (C) described later and an embodiment of (D) described later may be described separately.). However, unless otherwise specified, various embodiments of the bright ink layer in the present description are embodiments common to various bright ink layers.

In the embodiment of (A) above, the first bright ink layer contains a first bright pigment, and the second bright ink layer contains a second bright pigment different from the first bright pigment.

The first bright ink layer may contain only the first bright pigment, or may contain other bright pigments. When a plurality of types of bright pigments are contained in the first bright ink layer, it is preferable that the first bright pigment is blended so as to be a main component, and it is preferable that the second bright pigment is not contained. Similarly, the second bright ink layer may contain only the second bright pigment, or may contain other bright pigments. When a plurality of types of bright pigments are contained in the second bright ink layer, it is preferable that the second bright pigment is blended so as to be a main component, and it is preferable that the first bright pigment is not contained.

That the first bright pigment or the second bright pigment is the main component means that the ratio of the first bright pigment or the second bright pigment to the total bright pigments is 50% by mass or more. The ratio is preferably 70% by mass or more, more preferably 90% by mass or more, and further more preferably 100% by mass.

As described above, in the embodiment of (A) described above, the first bright ink layer and the second bright ink layer mainly contain different bright pigments, so that the first bright ink layer and the second bright ink layer can be easily visually recognized as different layers from each other. In particular, when the colors of the first bright ink layer and the second bright ink layer are different from each other, the difference in color of each layer becomes clear, which is preferable.

In the embodiment of (B) above, the first bright ink layer and the second bright ink layer contain a bright pigment, and the content of the bright pigment in the first bright ink layer is different from the content of the bright pigment in the second bright ink layer.

In the embodiment of (B) above, the types of the bright pigments contained in the first bright ink layer and the second bright ink layer may be the same or different.

As described above, in the embodiment of (B) described above, the content of the bright pigment in the first bright ink layer is different from the content of the bright pigment in the second bright ink layer. As a result, it is possible to easily make a difference between the number of laminated bright pigments in the first bright ink layer and the number of laminated bright pigments in the second bright ink layer. Therefore, in the embodiment of (B) described above, a difference in brightness or color is caused between the first bright ink layer and the second bright ink layer, and the layers can be easily visually recognized as different layers.

The first bright ink layer and the second bright ink layer can each contain pigments other than the bright pigment, if necessary, in order to adjust to a desired color.

The first bright ink layer and the second bright ink layer are preferably transparent or translucent. When the first bright ink layer and the second bright ink layer are transparent or translucent, as will be described later, it is possible to easily obtain an effect of color mixing due to the overlap of the first bright ink layer and the second bright ink layer. Further, the color derived from the base can be easily visually recognized.

In the present disclosure, when the decorative material 10 is viewed in a plan view, the first bright ink layer and the second bright ink layer are provided on at least a part of a base material 14, respectively.

When the first bright ink layer is provided on a part of the base material 14, it is preferable that the first bright ink layer is composed of an aggregate of a plurality of independent regions (an aggregate of independent regions 16A-1 and 16A-2 in FIG. 1) when the decorative material 10 is viewed in a plan view. Further, when the second bright ink layer is provided on a part of the base material 14, it is preferable that the second bright ink layer is composed of an aggregate of a plurality of independent regions (an aggregate of independent regions 16B-1 to 16B-3 in FIG. 1) when the decorative material 10 is viewed in a plan view. In the present disclosure, a region including an edge of the decorative material 10 (base material 14) as a contour line as in reference numeral 16B-3 is also referred to as an "independent region".

In FIG. 1, the first bright ink layer and the second bright ink layer have a plurality of independent regions. However, in the decorative material of the present disclosure, at least one of the first bright ink layer and the second bright ink layer may have one independent region.

In the region indicated by reference numeral F in FIG. 1, when the decorative material 10 is viewed in a plan view, the first bright ink layer has a region that overlaps with the second bright ink layer (reference numeral Ro in FIG. 1) and a region that does not overlap with the second bright ink layer (reference numeral Ra in FIG. 1). The second bright ink layer has a region that overlaps with the first bright ink layer (reference numeral Ro in FIG. 1) and a region that does not overlap with the first bright ink layer (reference numeral Rb in FIG. 1).

In the present disclosure, there may be a region that does not overlap with other bright ink layers, depending on the pattern of the bright pattern layer 12. Specifically, the independent region 16A-2 of the first bright ink layer in FIG. 1 clearly does not overlap with the second bright ink layer and the independent region 16B-2 of the second bright ink layer in FIG. 1 clearly does not overlap with the first bright ink layer.

When the decorative material 10 is viewed in a plan view, the region Ra and the region Rb exhibit the colors of the first bright ink layer and the second bright ink layer, respectively. The overlapping region Ro exhibits a mixture of the color of the first bright ink layer and the color of the second bright ink layer.

The bright ink layer containing a bright pigment has the property that the degree of brightness (intensity) changes according to a combination of an angle of light incident on the decorative material and an angle at which an observer observes the decorative material (line-of-sight angle). Further, it has a property that the degree of brightness changes depending on the distribution of the film thickness in the independent regions and the degree of overlapping of the bright ink layers described later (distribution of the film thickness in the overlapping region). In particular, Ro, which is an overlapping region, tends to give a variety of brightness feelings as compared with other regions Ra and Rb.

Further, when a pearl pigment is used as the bright pigment, the color of each region of Ra, Rb, and Ro can be easily changed according to the angle of light incident on the decorative material and the angle of sight of the observer.

As described above, the decorative material 10 of the present disclosure can easily express the pattern of the bright pattern layer with multiple colors or various brightnesses, and can easily express a more complicated design. Therefore, it is possible to obtain a decorative material having a design with an excellent visual effect.

Further, the base region Ru can be configured to exhibit a color derived from the base (base coating layer or base material) of the bright pattern layer. Further, since the bright ink layer is transparent or translucent, the color of the base can also be visually recognized when observing the decorative material. In this way, in the decorative material of the present disclosure, various patterns can be expressed by the pattern and color of the bright pattern layer 12 and the color derived from the base.

In the present disclosure, it is preferable that at least one of the first bright ink layer and the second bright ink layer has film thicknesses partially different.

In the case where the first bright ink layer is composed of an aggregate of a plurality of independent regions, when the maximum film thicknesses of the respective independent regions are compared, it is preferable that the maximum film thickness of at least one independent region is different from the maximum film thickness of the other independent regions.

In the case where the second bright ink layer is composed of an aggregate of a plurality of independent regions, when the maximum film thicknesses of the respective independent regions are compared, it is preferable that the maximum film thickness of at least one independent region is different from the maximum film thickness of the other independent regions.

Further, when the first bright ink layer is partially provided as one independent region, it is preferable that the film thickness at an arbitrary position in the independent region when viewed in a plan view is different from the film thickness at other positions in the independent region.

Similarly, when the second bright ink layer is partially provided as one independent region, it is preferable that the film thickness at an arbitrary position in the independent region when viewed in a plan view is different from the film thickness at other positions in the independent region.

Further, when the decorative material is viewed in a plan view, the first bright ink layer is composed of an aggregate of a plurality of independent regions, and it is preferable that at least one or more of the independent regions are partially different in film thickness within the independent regions.

When the decorative material is viewed in a plan view, the second bright ink layer is composed of an aggregate of a plurality of independent regions, and it is preferable that at least one or more of the independent regions are partially different in film thickness within the independent regions.

FIG. 2 is a schematic view of the cross-sectional shape of the bright ink layer in the decorative material of the present disclosure, and is a diagram for explaining that the film thicknesses of the bright ink layer are partially different. For the sake of brevity, FIG. 2 shows an embodiment in which the first bright ink layer and the second bright ink layer do not overlap with the other bright ink layer, respectively. For the understanding of the present disclosure, in FIG. 2, the dimension in the thickness direction is enlarged and emphasized in the independent region as compared with the dimension in the base material surface direction. In the decorative material of the present disclosure, the ratio of the dimension in the plane direction to the dimension in the thickness direction (dimension in the plane direction/dimension in the thickness direction) of the independent region is preferably about $10^2$ to $10^5$ times. Therefore, in reality, the cross section of the independent region can be a plateau type with a substantially flat top or a mountain type with an extremely gentle slope.

In the present disclosure, the "cross section" corresponds to a surface obtained by cutting the decorative material in the direction in which the base material and the bright pattern layer are laminated. For example, it means a cross section of the decorative material shown in FIG. 1 cut in the Z-axis direction.

As illustrated in FIG. 2, in independent regions 20A-1 and 20A-2 of the first bright ink layer, the film thickness of the end region is smaller than the film thickness of the central portion. Further, assuming that the maximum film thickness of the independent region 20A-1 (the film thickness at the apex of the mountain-shaped independent region illustrated in FIG. 2) is $h_{a1}$ and the maximum film thickness of the independent region 20A-2 is $h_{a2}$, $h_{a1}$ and $h_{a2}$ are different.

Similarly, as illustrated in FIG. 2, in independent regions 20B-1 and 20B-2 of the second bright ink layer, the film thickness of the end region is smaller than the film thickness of the central portion. Further, assuming that the maximum film thickness of the independent region 20B-1 (the film thickness at the apex of the mountain-shaped independent region illustrated in FIG. 2) is $h_{b1}$ and the maximum film thickness of the independent region 20B-2 is $h_{b2}$, $h_{b1}$ and $h_{b2}$ are different.

The film thickness range of the bright ink layer (the film thickness range of the independent region) is not particularly limited; however, in order to obtain a sufficient visual effect, the maximum film thickness of the bright ink layer (independent region) is preferably 0.5 μm or more, and more preferably 1 μm or more. On the other hand, when the bright ink layer becomes too thick, it may be difficult to form by coating, the productivity may decrease, and the production cost may increase. In addition, when the film thickness exceeds a certain level, the visual effect commensurate with the increase in film thickness cannot be obtained, and there is a risk that the decorative material may be of poor quality due to problems such as peeling of the bright pattern layer and deterioration of the tactile sensation. Considering these, the maximum film thickness of the bright ink layer (independent region) is preferably about 20 μm or less, more preferably 15 μm or less, further more preferably 10 μm or less, and still more preferably 5 μm or less. Not only the first bright ink layer and the second bright ink layer, but also a third bright ink layer described later is preferably in the range of the maximum film thickness described above.

When the film thicknesses are partially different in one independent region in the first bright ink layer, the second bright ink layer, and the third bright ink layer described later, it is preferable to have a film thickness distribution in the range of 0.15 μm to 6.0 μm. The film thickness distribution is more preferably 0.20 μm to 4.0 μm.

When comparing the respective independent regions of the first bright ink layer and the second bright ink layer, examples of a method for making the maximum film thicknesses of the independent regions different include a method of changing specifications related to the amount of ink transfer of a plate, such as the number of screen lines, cell area, halftone dot area, and plate depth of the plate, which are used when forming by various printing methods. Among these methods, plate depth control is preferable.

Further, examples of a method for making the film thicknesses partially different within one independent region include a method related to the amount of ink transfer of the plate described above, and moreover, a method of lowering the leveling property of the ink. Among these methods, plate depth control is preferable.

There is a correlation between the film thickness of the bright ink layer and the number of laminated bright pigments in the thickness direction of the bright ink layer. Specifically, the thicker the film thickness of the bright ink layer, the more likely the number of laminated bright pigments increases in the thickness direction of the bright ink layer. Then, as the number of laminated bright pigments increases, the degree of multiple reflection between the bright pigments increases. Therefore, the thicker the film thickness of the bright ink layer, the darker the color is more likely to be felt, and the stronger the brightness is easily felt. As described above, by making the film thicknesses of the first bright ink layer or the second bright ink layer partially different, the degree of multiple reflection can be made to be partially different. Therefore, it is possible to easily make natural change of color such as color concentration differences and change the intensity of brightness in the first bright ink layer and the second bright ink layer depending on the location, and it is possible to express a more complicated design.

It is preferable that at least one of the film thickness of the first bright ink layer and the film thickness of the second bright ink layer in the region where the first bright ink layer and the second bright ink layer overlap is partially different.

FIG. 3 is a schematic cross-sectional view taken along the line L-L' of the region indicated by reference numeral F in FIG. 1. FIG. 3 shows an example in which the second bright ink layer is formed after the first bright ink layer is formed, and an example in which the film thickness is partially changed within an independent region. Also in FIG. 3, for the understanding of the present disclosure, the dimension in the thickness direction is enlarged and emphasized as compared with the dimension in the base material surface direction of the independent region.

The independent region 16A-1 of the first bright ink layer illustrated in FIG. 3 has a mountain-shaped cross-sectional shape as described in FIG. 2. In the overlapping region Ro, the film thickness of the independent region 16A-1 changes continuously so as to gradually decrease from the center toward the end.

On the other hand, the independent region 16B-1 of the second bright ink layer illustrated in FIG. 3 is formed so as to have a mountain-shaped cross-sectional shape similar to that in FIG. 2 when used alone. However, in the overlapping region Ro, the independent region 16B-1 rests on the independent region 16A-1. Therefore, in the overlapping region Ro, the hypotenuse is different from that in FIG. 2; however, the film thickness of the independent region 16B-1 changes similarly to that of the independent region 16A-1. In FIG. 3, the film thickness of the independent region 16B-1 in the overlapping region Ro changes continuously so as to gradually decrease from the center toward the end.

In FIG. 3, in the non-overlapping region Ra of the independent regions 16A-1, the change in color concentration difference and brightness can be easily visually recognized by changing the film thickness of the first bright ink layer as described above. Specifically, in a place where the film thickness is large, the degree of multiple reflection by the bright pigment increases, the color tends to be dark and the brightness strong. On the other hand, in a place where the film thickness is small, the color tends to be light and the brightness weak, making it easy to see. Similarly, in the non-overlapping region Rb of the independent region 16B-1, the color concentration difference and the intensity of brightness can be easily visually recognized by changing the film thickness of the second bright ink layer.

In FIG. 3, since the film thicknesses of the first bright ink layer and the second bright ink layer are different in the region Ro, color mixing and brightness tend to be in accordance with the film thickness ratio of the first bright ink layer and the second bright ink layer. Specifically, when the thickness of the first bright ink layer is larger, the color of the region Ro tends to be a color mixture close to that of the first bright ink layer, and when the film thickness of the second bright ink layer is larger, the color of the region Ro tends to be a color mixture close to that of the second bright ink layer. Further, the total film thickness of the first bright ink layer and the second bright ink layer in the region Ro makes it easy to express the concentration difference. Specifically, as the total film thickness increases, the color of the region Ro becomes darker and the brightness tends to become stronger due to the effect of multiple reflections by the bright pigment. Therefore, the pattern formed by the first bright ink layer and the second bright ink layer can be easily expressed not only by the color change but also by the concentration difference and the intensity of the brightness. By continuously changing the film thickness within the independent region 16A-1 and the independent region 16B-1, it is possible to easily express natural color change, concentration difference, and brightness change. Further, as shown in FIG. 3, when the film thicknesses of the first bright ink layer and the second bright ink layer gradually decrease from the center toward the ends in the overlapping region Ro, it is possible to easily express continuous changes (gradation) in color and brightness.

As described above, by partially changing the film thickness of the bright ink layer, it becomes easier to express various colors including brightness in addition to the three elements of color (hue, lightness, and saturation). Therefore, it is possible to obtain a decorative material having a design with a particularly excellent visual effect. According to the present disclosure, it is possible to easily obtain a decorative material having excellent reproduction of various design appearances on a metal surface generated by forming a thin film of a metal compound such as an oxide film on the surface by various methods such as heating in air or steam, chemical reaction with various chemicals, and electrochemical treatment.

In FIG. 1, for the sake of brevity, the independent regions of the first bright ink layer and the second bright ink layer are represented as circular, elliptical, and elliptical fan shapes. However, the present disclosure is not limited thereto. The shape of the independent region when viewed in a plan view may be a simple shape such as a triangle and a quadrangle, a shape in which a plurality of the simple shapes are combined, and a complex shape (so-called "irregular shape") that needs to be approximated by a combination of complex functions such as polynomials and infinite series.

The size (area) of each of the independent regions is not particularly limited. However, the size is visually recognizable and it is preferable that the size is set in consideration of the design (the pattern of the bright pattern layer). Further, from the viewpoint of productivity when the bright pattern layer is formed by printing, it is preferable that the independent regions have a certain size (area). For example, for any independent region, the width of the independent region measured so as to pass through the center of the circumscribed circle of the independent region is preferably in the range of about 5 mm to 60 cm.

Further, there are no particular restrictions on the distance between the independent regions, the number of independent regions provided as each bright ink layer, and the position where the respective independent region is formed.

These can be appropriately set according to the pattern of the bright ink layer required to obtain a bright pattern layer of a predetermined pattern.

The area ratio of the bright pattern layer to the entire surface of the decorative material, the area ratio of the first bright ink layer and the second bright ink layer in the plane of the decorative material, the area ratio of a region where the first bright ink layer and the second bright ink layer overlap in the plane of the decorative material, the area ratio of the regions Ro, Ra, Rb, Ru, and the like can be appropriately set according to the pattern of the bright pattern layer.

FIG. 4 is a schematic plan view for explaining a decorative material according to an embodiment of the present disclosure, and shows an example in which three types of bright ink layers (first bright ink layer, second bright ink layer, and third bright ink layer) are formed as the bright pattern layers. In the present disclosure, it is also possible to provide four or more types of bright ink layers.

The third bright ink layer satisfies the following relationship (C) or (D).

(C) The third bright ink layer contains a third bright pigment different from the first bright pigment and the second bright pigment.

(D) The third bright ink layer contains a bright pigment, and the content ratio of the bright pigment in the third bright ink layer is different from the content ratio of the bright pigment in the first bright ink layer and the content ratio of the bright pigment in the second bright ink layer.

The third bright ink layer may satisfy one of the relationships (C) and (D), and may also satisfy both (C) and (D).

In an embodiment of (C) above, the third bright ink layer contains a third bright pigment different from the first bright pigment and the second bright pigment. The pigment contained in the third bright ink layer may be only the third bright pigment or a mixture with other bright pigments. In addition, each of the third bright ink layers may contain a pigment other than the bright pigment, if necessary, in order to adjust to a desired color. When a plurality of types of bright pigments are contained in the third bright ink layer, it is preferable that the third bright pigment is blended so as to be a main component, and it is preferable that the first bright pigment and the second bright pigment are not contained. Specifically, the ratio of the third bright pigment to the total bright pigments is preferably 50% by mass or more, more preferably 70% by mass or more, further more preferably 90% by mass or more, and still more preferably 100% by mass.

In the embodiment of (C) described above, the third bright ink layer contains the third bright pigment different from the first bright pigment and the second bright pigment, and thus the third bright ink layer exhibits a color different from those of the first bright ink layer and the second bright ink layer. In particular, when the colors of the first bright ink layer, the second bright ink layer, and the third bright ink layer are different from each other, the difference in color of each layer becomes clear, which is preferable.

The embodiment of (C) is preferably combined with the embodiment of (A).

In an embodiment of (D) above, the content ratio of the bright pigment in the third bright ink layer is different from the content ratio of the bright pigment in the first bright ink layer and the content ratio of the bright pigment in the second bright ink layer.

In the embodiment of (D) above, the type of the bright pigment contained in the third bright ink layer may be the same as or different from the types of the bright pigments contained in the first bright ink layer and the second bright ink layer.

In the embodiment of (D) described above, the content ratio of the bright pigment in the third bright ink layer is different from the content ratio of the bright pigment in the first bright ink layer and the content ratio of the bright pigment in the second bright ink layer. As a result, it is possible to easily make a difference between the number of laminated bright pigments in the third bright ink layer and the number of laminated bright pigments in the first bright ink layer as well as the number of laminated bright pigments in the second bright ink layer. Therefore, in the embodiment of (D) described above, a difference in brightness or color is caused between the third bright ink layer and the first bright ink layer as well as the second bright ink layer, and the layers can be easily visually recognized as different layers.

The embodiment of (D) is preferably combined with the embodiment of (B).

The first bright ink layer, the second bright ink layer, and the third bright ink layer are preferably transparent or translucent. When the first bright ink layer, the second bright ink layer, and the third bright ink layer are transparent or translucent, it is possible to obtain an effect of color mixing due to the overlap of each bright ink layer. Further, the color derived from the base can be easily visually recognized.

When a decorative material 30 is viewed in a plan view, the first bright ink layer, the second bright ink layer, and the third bright ink layer are provided on at least a part of a base material 34, respectively.

It is preferable that the first bright ink layer, the second bright ink layer, and the third bright ink layer are respectively composed of an aggregate of a plurality of independent regions when the decorative material 30 is viewed in a plan view. Specifically in FIG. 4, the first bright ink layer is composed of an aggregate of a plurality of independent regions 36A-1 to 36A-3. The second bright ink layer is composed of an aggregate of a plurality of independent regions 36B-1 to 36B-3. The third bright ink layer is composed of an aggregate of a plurality of independent regions 36C-1 to 36C-3.

In the region indicated by reference numeral F-1 in FIG. 4, when the decorative material 30 is viewed in a plan view, the first bright ink layer has a region that overlaps with only the second bright ink layer (reference numeral Ro-1), a region that overlaps with only the third bright ink layer (reference numeral Ro-2), a region that overlaps with the second bright ink layer and the third bright ink layer (reference numeral Ro-3), and a region that does not overlap with the second bright ink layer or the third bright ink layer (reference numeral Ra). Similarly, the second bright ink layer has a region that overlaps with only the first bright ink layer (reference numeral Ro-1), a region that overlaps with only the third bright ink layer (reference numeral Ro-4), a region that overlaps with the first bright ink layer and the third bright ink layer (reference numeral Ro-3), and a region that does not overlap with the first bright ink layer or the third bright ink layer (reference numeral Rb). The third bright ink layer has a region that overlaps with only the first bright ink layer (reference numeral Ro-2), a region that overlaps with only the second bright ink layer (reference numeral Ro-4), a region that overlaps with the first bright ink layer and the second bright ink layer (reference numeral Ro-3), and a region that does not overlap with the first bright ink layer or the second bright ink layer (reference numeral Rc).

The region indicated by reference numeral F-2 in FIG. 4 is a region composed of a region (reference numeral Ro-2) in which the first bright ink layer (independent region 36A-2) and the third bright ink layer (independent region 36C-2) overlap, and regions (reference numerals Ra, Rc) in which the first bright ink layer and the third bright ink layer do not overlap with each other. That is, the region F-2 corresponds to the region F in FIG. 1, which is composed of a region where the two bright ink layers overlap and regions where the two bright ink layers do not overlap.

A region that does not overlap with other bright ink layers, such as the independent regions 36A-3, 36B-2, 36B-3, and 36C-3 in FIG. 4, may be provided depending on the pattern of the bright pattern layer.

When the decorative material 30 is viewed in a plan view, the region Ra, the region Rb, and the region Rc exhibit the colors of the first bright ink layer, the second bright ink layer, and the third bright ink layer, respectively. The regions Ro-1 to Ro-4 where the bright ink layers overlap exhibit a mixture of the colors of the respective bright ink layers. Further, as described above, the brightness is likely to change in the bright pattern layer depending on the distribution of the film thickness in the independent regions and the degree of overlapping of the bright ink layers. In this way, by increasing the number of the bright ink layers constituting the bright pattern layer, it is possible to easily increase the variation of the colors and the brightness that can be expressed. Further, by providing regions such as regions Ro-1 to Ro-4 in which the combinations of the bright ink layers overlapping in the plane of the decorative material 30 are different, various patterns can be easily expressed. By increasing the number of the bright ink layers constituting the bright pattern layer in this way, it is possible to obtain a decorative material having a more excellent design property.

Also in the example shown in FIG. 4, it is preferable that at least one of the first bright ink layer, the second bright ink layer, and the third bright ink layer has film thicknesses partially different.

In the case where the third bright ink layer is composed of an aggregate of a plurality of independent regions, when the maximum film thicknesses of the respective independent regions are compared, it is preferable that the maximum film thickness of at least one independent region is different from the maximum film thickness of the other independent regions.

Further, in the case where the third bright ink layer is partially provided as one independent region, it is preferable that the film thickness at an arbitrary position in the independent region when viewed in a plan view is different from the film thickness at other positions in the independent region.

Moreover, when the decorative material is viewed in a plan view, the third bright ink layer is composed of an aggregate of a plurality of independent regions, and it is preferable that at least one or more of the independent regions are partially different in film thickness within the independent regions.

It is preferable that at least one of the film thickness of the first bright ink layer and the film thickness of the third bright ink layer in the region where the first bright ink layer and the third bright ink layer overlap is partially different. It is preferable that at least one of the film thickness of the second bright ink layer and the film thickness of the third bright ink layer in the region where the second bright ink layer and the third bright ink layer overlap is partially different.

FIG. 5 is a schematic cross-sectional view taken along the line M-M' of the region indicated by reference numeral F-1 in FIG. 4. FIG. 5 shows an example in which the second bright ink layer and the third bright ink layer are formed in this order after the first bright ink layer is formed, and an example in which the film thickness is partially changed within each independent region. Also in FIG. 5, for the understanding of the present disclosure, the dimension in the thickness direction is enlarged and emphasized as compared with the dimension in the base material surface direction of the independent region.

In FIG. 5, in the independent region 36A-1 of the first bright ink layer, the film thickness of the end region is smaller than the film thickness of the central portion. In the overlapping regions Ro-2 and Ro-3, the film thickness of the independent region 36A-1 changes continuously so as to gradually decrease from the center toward the end.

The independent region 36B-1 of the second bright ink layer rests on the independent region 36A-1 in the overlapping region Ro-3, and the film thickness of the independent region 36B-1 changes.

The independent region 36C-1 of the third bright ink layer rests on the independent region 36A-1 and/or the independent region 36B-1 in the overlapping regions Ro-2, Ro-3, and Ro-4, and the film thickness of the independent region 36C-1 changes.

In FIG. 4 and FIG. 5, in the non-overlapping regions Ra, Rb, and Rc, the changes in color concentration difference and brightness can be easily visually recognized by changing the film thicknesses of the first bright ink layer, the second bright ink layer, and the third bright ink layer as described above. Specifically, in a place where the film thickness is large, the degree of multiple reflection by the bright pigment increases, the color is dark and the brightness is strong, making it easy to see. On the other hand, in a place where the film thickness is small, the color is light and the brightness is weak, making it easy to see.

In FIG. 4 and FIG. 5, in the overlapping regions Ro-1 to Ro-4, the color mixing and the brightness tend to be in accordance with the film thickness ratio of each bright ink layer. Further, in the regions Ro-1 to Ro-4, the concentration difference and brightness can be expressed by the total film thickness of the bright ink layers.

Therefore, even with the above configuration, by partially differentizing the film thickness of each bright ink layer, it is possible to easily express a natural gradation regarding the color concentration difference, the degree of color mixing, and the intensity of brightness. For this reason, it is possible to express a variety of colors, and it is possible to easily express various patterns. As a result, it is possible to obtain a decorative material having a design with a particularly excellent visual effect.

The decorative material of the present disclosure can also express a design having excellent design properties and a design closer to a real material by combining the pattern and color pattern of the bright pattern layer and the color derived from the base of the bright pattern layer as described above.

Preferable examples of the patterns that can be expressed by the decorative material of the present disclosure include patterns on the surface of a metal plate having a metal oxide film on the surface, such as an iron skin pattern, a rust pattern, and a baking pattern, and further, a metal plate surface pattern having a gloss due to interference such as an oil film pattern on the metal plate surface.

In addition, the patterns that can be expressed by the decorative material of the present disclosure include marble patterns (for example, travertine marble patterns), stone patterns that imitate the surfaces of rocks such as cleavage surfaces of granite plates, wood grain patterns (particularly wood grain patterns having a shiny glossy portion), cloth patterns (particularly cloth patterns imitating silk fabric including interference gloss), leather (leather grain patterns) patterns expressing leather grains, tile patterns, brick patterns, satin-finished patterns, sand grain patterns, geometric patterns, and worm patterns.

Next, an embodiment of the laminated structure of the decorative material of the present disclosure will be described.

FIG. 6 is a schematic cross-sectional view of a decorative material according to an embodiment of the present disclosure. FIG. 6 is a schematic cross-sectional view when cut in the Z-axis direction in FIG. 1, for example.

In a decorative material 100 of FIG. 6, a primer layer 104, a base coating layer 106, a bright pattern layer 108, a protective layer 110, a heaping layer 120, and a surface coating layer 112 are provided on a base material 102 in this order. In the present disclosure, both the heaping layer 120 and the surface coating layer 112 may be provided, or either of the heaping layer 120 and the surface coating layer 112 may be provided. For example, instead of the structure of FIG. 6, it is also possible to omit the heaping layer and form a layer structure in which the surface coating layer 112 is directly formed on the protective layer 110. The protective layer may be provided or omitted regardless of the presence or absence of the heaping layer.

Hereinafter, each layer will be described in detail.

<Base Material>

The base material 102 is not particularly limited, as long as it is commonly used as a decorative material. For example, resin base materials, metal base materials, ceramic base material, fibrous base material, woody base materials, or the like can be appropriately selected corresponding to the application. Each of the aforementioned base materials may be used individually or may be a laminate in any combination. In the case where the base material 102 is a laminate, an adhesive layer may be further provided between each two layers of the laminate.

Examples of the resin base materials include those consisting of various synthetic resins. Examples of the synthetic resins include olefin resins such as polyethylene resins, polypropylene resins, and polymethylpentene resins, vinyl-based resins such as polyvinyl chloride resins, polyvinylidene chloride resins, polyvinyl alcohol resins, vinyl chloride-vinyl acetate copolymer resins, ethylene-vinyl acetate copolymer resins, and ethylene-vinyl alcohol copolymer resins, polyester resins such as polyethylene terephthalate resins, polybutylene terephthalate resins, and ethylene naphthalate-isophthalate copolymer resins, acrylic resins such as polymethylmethacrylate resins, polyethylmethacrylate resins, and polybutyl acrylate resins, polyamide resins typified by nylon 6 or nylon 66, cellulose resins such as cellulose triacetate resins and cellophane, polystyrene resins, polycarbonate resins, polyarylate resins, and polyimide resins.

Examples of the metal base materials include pure metals consisting of a single metal element such as aluminum, iron, copper, and titanium, and those consisting of alloys such as carbon steel, stainless steel, duralumin, brass, and bronze containing one or more of these metals. Further, these metals processed by surface plating or the like can also be used as base materials. Since metal base materials have excellent heat resistance, they are resistant to deformation or the like during heat treatment at high temperature (drying process after formation of a base coating layer and the final baking process) in the production method described later and thus are preferable. Since metal base materials have the aforementioned properties, they enable the shape of the heaping layer to be easily maintained. Further, use of a metal base material can further enhance the effects due to the bright pigments because the reflection on the surface of the metal base material can be superimposed on the reflection on the bright pigment.

Examples of the ceramic base materials include ceramic construction materials such as gypsum boards, calcium silicate plates, and wood cement boards, ceramics, glass, enamel, baked tiles and other ceramics. Since ceramic base materials also have excellent heat resistance, they are resistant to deformation or the like during heat treatment at high temperature in the production method described later and thus are preferable.

As a fibrous base material, paper base materials such as thin paper, kraft paper, titanium paper, linter paper, paperboards, and base paper for gypsum boards can be used, for example. These paper base materials may be further supplemented with resins such as acrylic resins, styrene butadiene rubber, melamine resins, urethane resins (resin impregnation after papermaking or filling during papermaking) for enhancing the strength between the fibers of the paper base material or the interlayer strength between another layer and such a paper base material or preventing fluffing. Examples of the paper base material supplemented with resins include inter-paper reinforced paper and resin-impregnated paper.

Further, a vinyl wallpaper raw fabric or the like with a vinyl chloride resin layer provided on the surface of a paper base material also can be used as a fibrous base material.

Further, examples of the fibrous base materials include woven fabrics and non-woven fabrics of various fibers having a paper-like appearance and properties, although they are distinguished from the aforementioned paper base materials. Examples of the various fibers include inorganic fibers such as glass fibers, asbestosfibers, potassium titanate fibers, alumina fibers, silica fibers, and carbon fibers. Further, examples of the various fibers include synthetic resin fibers such as polyester fibers, acrylic fibers, and viniron fibers. The papers are preferably used while being laminated with a plastic base material having excellent excipient suitability in view of the excipient suitability of the irregular pattern.

Examples of the woody base materials include wood veneers of cedar, cypress, pine, zelkova, Japanese oak, oak, lauan and teak, plywoods, laminated woods, particle boards, and medium-density fiberboards (MDF).

The thickness of the base material 102 is not particularly limited and can be appropriately set according to the application, required specification and the like. For example, the thickness of the base material 2 is preferably 0.2 mm or more and 5 mm or less, more preferably 0.4 mm or more and 3 mm or less.

<Primer Layer>

The primer layer 104 is provided between the base material 102 and the bright pattern layer 108, as required. When the decorative material has the base coating layer 106, the primer layer 104 is preferably provided between the base material 102 and the base coating layer 106. The primer layer 104 serves to ensure good adhesion between the base material 102 and the base coating layer 106, or between the base material 102 and the bright pattern layer 108.

An ink (ink for primer layers) containing a material constituting a primer layer, for example, is used for forming the primer layer 104.

Examples of the materials constituting the primer layer include resins. The type of resin can be selected in consideration of the material of the layer in contact with the primer layer (for example, the material of the base material 102 and the material of the resin serving as a binder of the base coating layer 106 described later). The ink for primer layers may appropriately contain a solvent.

Preferable examples of the resin include resins such as urethane resins, acrylic polyol resins, acrylic resins, ester resins, amide resins, butyral resins, styrene resins, urethane-acrylic copolymers, polycarbonate urethane-acrylic copolymers (urethane-acrylic copolymers derived from a polymer (polycarbonate polyol) having a carbonate bond in the polymer main chain and having two or more hydroxy groups in the terminal and side chains), vinyl chloride-vinyl acetate copolymer resins, vinyl chloride-vinyl acetate-acrylic copolymer resins, chlorinated propylene resins, nitrocellulose resins (nitrocellulose), cellulose acetate resins, and fluorine resins, and these can be used individually or in combination of two or more.

In addition to one-component curable resins, resins of various types including two-component curable resins with a curing agent such as isocyanate compounds, e.g., tolylene diisocyanate (TDI), diphenylmethane diisocyanate (MDI), hexamethylene diisocyanate (HDI), isophorone diisocyanate (IPID), and xylylene diisocyanate (XDI) can be used.

In view of improving the weather resistance, the primer layer 104 preferably contains a weathering agent such as an ultraviolet absorber and a light stabilizer.

In view of the effect of improving the adhesion between layers or the like, the thickness of the primer layer 104 is preferably 1 µm or more, more preferably 2 µm or more, further preferably 3 µm or more. Further, the upper limit of the thickness of the primer layer 104 is preferably 10 µm or less, more preferably 7 µm or less, further preferably 5 µm or less.

<Base Coating Layer>

The base coating layer 106 is a layer provided between the base material 102 and the bright pattern layer 108, as required. The base coating layer 106 is preferably provided on the entire surface of the base material.

In the present disclosure, the base coating layer 106 may be colored or colorless.

By coloring the base coating layer 106 in any color, it is possible to impart a color intended as a base of the bright pattern layer 108. It is preferable that the base coating layer 106 is formed as a colored opaque layer and imparts an intended color and hide the base material 102 when viewed from a viewer. For example, when a dark, such as black, opaque layer is formed as a base coating layer, a design such as rust or baked feeling can be expressed.

On the other hand, by making the base coating layer 106 a colorless layer (transparent layer), the appearance such as pattern, color, and gloss of the base material 102 can be utilized. Further, when the transparent layer is formed as the base coating layer, a design such as an oil film can be expressed.

As described above, by enabling the base coating layer to function as the base of the color of the decorative material, the design properties of the decorative material can be enhanced.

For forming the base coating layer 106, for example, an ink containing a material constituting a base coating layer (ink for base coating layers) is used.

Examples of the material that constitutes the base coating layer include resins. The ink for base coating layers may appropriately contain a solvent.

The resin to be used for forming the base coating layer 106 is not particularly limited. Examples thereof include thermoplastic resins such as fluororesins, (meth)acrylic resins, urethane resins, polyester resins, polyamide resins, (meth)acrylic acid ester-olefin copolymers, vinyl chloride-vinyl acetate copolymers, ethylene-vinyl acetate copolymers (EVA resins), ionomer resins, and olefin-α olefin copolymer resins; and curable resins such as fluororesins, epoxy resins, phenolic resins, urea resins, polyester resins, melamine resins, alkyd resins, polyimide resins, silicone resins, hydroxy functional acrylic resins, carboxy functional acrylic resins, amide functional copolymers, and urethane resins. Here, the curable resins include thermosetting resins, ionizing radiation curable resins, and two-component curable resins.

Further, in the case of providing the base coating layer 106 as an opaque layer (a hiding layer) and a translucent layer, the base coating layer 106 preferably contains colorants such as pigments together with the aforementioned resins.

The colorants to be contained in the base coating layer 106 are not particularly limited. Examples thereof include inorganic pigments such as carbon black, iron black, titanium white, antimony white, yellow titanium yellow, red iron oxide (Bengala), cadmium red, ultramarine, and cobalt blue; and organic pigments or dyes such as quinacridone red, isoindolinone yellow, and phthalocyanine blue. These colorants may be used individually or in combination of two or more.

In order to make the pattern of the bright pattern layer 108 stand out more easily, it is preferable to add a dark colorant to the base coating layer 106. Examples of the dark colorant include carbon black and iron oxide.

The base coating layer 106 may contain various additives according to the desired physical properties in addition to the aforementioned components. Examples of the additives include weather resistance improvers such as ultraviolet absorbers and light stabilizers, abrasion resistance improvers, polymerization inhibitors, infrared absorbers, defoamers, and fillers. Further, in the case of using a curable resin for forming the base coating layer 106, a curing agent may be contained. Such an additive may be appropriately selected from those commonly used for use.

The thickness of the base coating layer 106 is not particularly limited and can be appropriately set according to the application, required specification and the like. For example, the thickness of the base coating layer 106 is preferably 5 µm or more and 40 µm or less, preferably 10 µm or more and 30 µm or less.

<Bright Pattern Layer>

The bright pattern layer 108 is provided on the front side of the base material 102, and is a layer imparting a design property to the decorative material. As described above, the bright pattern layer 108 consists of a plurality of bright ink layers.

For forming the bright ink layer, for example, an ink containing a material constituting a bright ink layer (ink for bright ink layers) is used.

Materials constituting the bright ink layer include binder resins and bright pigments. The ink for the bright ink layers may appropriately contain a solvent, a matting agent, and the like. When the bright ink layer contains a matting agent, the particle size of the matting agent is preferably less than 5 µm, more preferably 4 µm or less, and further more preferably 3 µm or less, in order to suppress deterioration of the visual effect of the bright pigment.

Preferable examples of the binder resin include resins such as urethane resins, acrylic polyol resins, acrylic resins, polyester resins, alkyd resins, amide resins, butyral resins, styrene resins, urethane-acrylic copolymers, vinyl chloride-vinyl acetate copolymers, vinyl chloride-vinyl acetate-acrylic copolymers, nitrocellulose (nitrocellulose), cellulose acetate, and fluororesins. Further, curable resins such as a two-component curable urethane resin containing polyol as a base resin and isocyanate as a curing agent may be used, for example. These can be used individually or in combination of two or more. For example, as will be described later in the production method, in the case of baking after forming the bright pattern layer 108 in a decorative material using a metal plate as a base material, a fluorine-based resin, an acrylic-based resin, or a polyester resin is preferably selected as the binder resin of the bright pattern layer 108 in view of the processability.

Pearl pigments and metallic pigments are typical examples of bright pigments used in the bright pattern layer 108.

Examples of the pearl pigments include interference pearl pigments (polarized pearl pigments); colored pearl pigments; white pearl pigments; and shells of shellfish such as pearl oysters, scaly foil pieces made of basic lead carbonate, bismuth oxide chloride, etc.

Interference pearl pigments are formed by coating the surface of a base of scaly foil pieces of mica, aluminum, glass or the like with a coating layer. The coating layer is a colorless high refractive index material such as titanium dioxide, and the thickness of the coating layer is more than 0.15 μm. The thickness changes the reflected and transmitted light, resulting in different interference colors.

The colored pearl pigment has a chromatic color, and examples thereof include those in which the coating layer on the surface of the base is made of a colored high refractive index material such as ferric oxide, those in which the surrounding of a white pearl pigment is further coated by a colored high refractive index material such as ferric oxide or by other colored pigments, and those in which pigments or other colorants are added in the coating layer.

The white pearl pigment is obtained by coating the surface of the base of scaly foil pieces of mica, aluminum, glass or the like with a coating layer made of a colorless high refractive index material such as titanium dioxide. Moreover, the coating layer has a relatively small thickness of about 0.1 to 0.15 μm and appears white or silver because it reflects almost all wavelengths of light.

Examples of the metallic pigments include those made of scaly foil pieces of metals such as aluminum, brass, tin, gold, silver and copper.

The content of the bright pigment in each bright ink layer is preferably 1 part by mass to 40 parts by mass, more preferably 3 parts by mass to 30 parts by mass, further more preferably 5 parts by mass to 15 parts by mass with respect to 100 parts by mass of the binder resin.

The decorative material of the present disclosure may contain a bright pigment in a layer other than the bright ink layer as long as the effect of the decorative material is not impaired. However, the content of the bright pigment in the layer other than the bright ink layer is preferably small. The content of the bright pigment in the layer other than the bright ink layer is preferably 4% by mass or less, more preferably 2% by mass or less, most preferably 0% by mass, based on the total solid content of the layer.

The bright pigment contained in each bright ink layer may be used individually or in combination of two or more. When two or more types are combined, they may be two or more types selected from the above pearl pigments, or two or more types selected from the above metallic pigments, or a combination of one or more selected from the above pearl pigments and one or more selected from the above metallic pigments. Moreover, each bright ink layer may contain a colorant other than the bright pigment (for example, a colorants listed for the base coating layer) as long as the visual effect of the bright pigment is not impaired.

In the present description, with regard to the first bright ink layer and the second bright ink layer, "the first bright pigment is different from the second bright pigment" in each layer means that the first bright pigment and the second bright pigment are different in at least one of the reflection characteristics selected from a luminous reflectance Y value, a spectral reflectance, an L* value, an a* value and a b* value. Similarly, in the present description, that "the third bright pigment is different from the first bright pigment and the second bright pigment" means that the third bright pigment is different from the first bright pigment and the second bright pigment in at least one of the reflection characteristics selected from the luminous reflectance Y value, the spectral reflectance, the L* value, the a* value and the b* value. In the present description, the L* value, the a* value and the b* value mean the L* value, a* value and b* value of an L*a*b* color system. The L*a*b* color system was standardized by the International Commission on Illumination (CIE) in 1976 and is based on the L*a*b* color system, which is adopted in JIS Z8781-4:2013.

Examples in which the first bright pigment and the second bright pigment are different include the following combinations (1) to (12). Of course, the combinations are not limited to the examples below, and combinations other than those below are also possible.

(1) A combination of a white pearl pigment and an interference pearl pigment.
(2) A combination of a white pearl pigment and a colored pearl pigment.
(3) A combination of an interference pigment and a colored pearl pigment.
(4) A combination of a first interference pearl pigment and a second interference pearl pigment different in the thickness of a coating layer from that of the first interference pearl pigment.
(5) A combination of a first colored pearl pigment and a second colored pearl pigment different in color from that of the first colored pearl pigment.
(6) A combination of an aluminum pigment and a white pearl pigment.
(7) A combination of an aluminum pigment and an interference pearl pigment.
(8) A combination of an aluminum pigment and a colored pearl pigment.
(9) A combination of an aluminum pigment and a brass pigment.
(10) A combination of a brass pigment and a white pearl pigment.
(11) A combination of a brass pigment and an interference pearl pigment.
(12) A combination of a brass pigment and a colored pearl pigment.

In the present disclosure, a pearl pigment is preferably used from the viewpoint of taking advantage of an effect of coloring mixing and superimposition of brightness when glossy ink layers overlap, as well as the change in color when an angle of light incident on the decorative material or an angle of the line of sight of an observer. In particular, an interference pearl pigment is preferably used since it is possible to express the design of an appearance using interference colors. By using a pearl pigment, particularly an interference pearl pigment, it is possible to easily reproduce patterns on the surface of a metal plate having a metal oxide film on the surface, such as an iron skin pattern, a rust pattern, and a baking pattern.

In the present description, that "the content ratio of the bright pigment in the first bright ink layer is different from the content ratio of the bright pigment in the second bright ink layer" means that the content of the bright pigment with respect to 100 parts by mass of the binder resin in the first bright ink layer (in the present description, it may be referred to as the "first content") is different from the content of the bright pigment with respect to 100 parts by mass of the binder resin in the second bright ink layer (in the present description, it may be referred to as the "second content"). Similarly, that "the content ratio of the bright pigment in the third bright ink layer is different from the content ratio of the bright pigment in the first bright ink layer and the content ratio of the bright pigment in the second bright ink layer" means that the content of the bright pigment with respect to 100 parts by mass of the binder resin in the third bright ink layer (in the present description, it may be referred to as the "third content") is different from the first content and the second content.

The absolute value of the difference between the first content and the second content is preferably 1 part by mass or more, more preferably 3 parts by mass or more, and even more preferably 5 parts by mass or more. Although the upper limit of the absolute value of the difference between the first content and the second content is not particularly limited, it is preferably 15 parts by mass or less, more preferably 12 parts by mass or less, and even more preferably 10 parts by mass or less.

The absolute value of the difference between the third content and the first and second contents is preferably 1 part by mass or more, more preferably 3 parts by mass or more, and even more preferably 5 part by mass or more, respectively. Although the upper limit of the absolute value of the difference between the third content and the first and second contents is not particularly limited, it is preferably 15 parts by mass or less, more preferably 12 parts by mass or less, and even more preferably 10 parts by mass or less, respectively.

The average length of the bright pigment is preferably 5 to 70 μm, more preferably 10 to 40 μm. The average length of the bright pigment is calculated as an average value of the lengths of any 20 particles (bright pigment) of the bright ink layer formed on the base material observed with an optical microscope or an electron microscope from a direction perpendicular to the surface of the base material. The length of one bright pigment means the maximum length of one bright pigment in the in-plane direction of the substrate.

Further, the average thickness of the bright pigment is preferably 0.01 to 1 μm, more preferably 0.02 to 0.7 μm, and even more preferably 0.05 to 0.5 μm. The average thickness of the bright pigment is calculated as an average value of the thicknesses of any 20 particles (bright pigment) obtained by observing the cross section of the bright ink layer formed on the base material with an optical microscope or an electron microscope. In addition, the thickness of one bright pigment is obtained by dividing a cross-sectional image of one bright pigment into five regions with an equal length in the longitudinal direction, measuring the thickness of the central portion of each region ($t_1$, $t_2$, $t_3$, $t_4$, and $t_5$) and averaging $t_1$ to $t_5$.

The bright pigment preferably has an aspect ratio of average length to average thickness (average length/average thickness) of 10 or more and 180 or less.

The bright pattern layer 108 may contain a weathering agent such as an ultraviolet absorber and a light stabilizer in view of improving the weather resistance.

<Heaping Layer>

The heaping layer 120 is provided on at least a part of the bright pattern layer 108 as necessary. The heaping layer is a layer that imparts a tactile sensation and a visual effect (gloss/matte effect) to the decorative material.

By combining the heaping layer and the bright pattern layer, it is possible to easily reproduce an iron skin pattern and a rust pattern. By combining the heaping layer and the bright pattern layer and by containing a dark colorant in the base coating layer, it is possible to more easily reproduce the iron skin pattern and the rust pattern. Furthermore, by using a metal base material as the base material, it is possible to more easily reproduce the iron skin pattern and the rust pattern. In addition, the appearance of the bright pattern layer can be changed between a portion having the heaping layer and a portion having no heaping layer. Therefore, the heaping layer is preferably provided on a part of the bright pattern layer. By forming the heaping layer on a part of the bright pattern layer, for example, it is possible to form a region that looks rusty and a region that does not look rusty in the surface of the decorative material, further enhancing the visual effect (the area where the heaping layer is formed tends to look rusty because the gloss is reduced.). Forming a heaping layer on a part of the bright pattern layer means a state in which, when the decorative material is viewed in a plan view, the heaping layer in a plan view overlaps a part of the bright pattern layer in a plan view.

Depending on the specifications required for the decorative material, the heaping layer 120 may not be provided.

The heaping layer 120 may be provided on the entire surface of the base material 102 when the decorative material 100 is viewed from the front side, or may be provided in a predetermined pattern on a part of the base material 102.

As schematically shown in FIG. 6, the heaping layer 120 is preferably formed from an aggregate of a plurality of projection regions 122. Each projection region 122 includes a plurality of particles 124, and the particles 124 are coated with a binder resin 126. Since the coating with the resin is thin, the surface of the projection regions 122 has an irregular shape roughly following the surface shape of the particles.

The heaping layer 120 can easily impart an excellent tactile sensation and an excellent gloss matte effect because of irregularities (relatively large irregularities) derived from a plurality of the projection regions 122 and irregularities (relatively small irregularities) derived from the particles 124 on the surface of each projection region 122.

An ink containing a material forming a heaping layer (ink for heaping layers), for example, is used for forming the heaping layer 120.

Examples of materials forming the heaping layer include particles and binder resins. The ink for the heaping layers may contain a solvent as appropriate.

Preferable examples of the binder resin for the heaping layer 120 include urethane resins, acrylic polyol resins, acrylic resins, ester resins, amide resins, butyral resins, styrene resins, urethane-acrylic copolymers, polycarbonate urethane-acrylic copolymers (urethane-acrylic copolymers derived from a polymer (polycarbonate polyol) having a carbonate bond in the polymer main chain and two or more hydroxy groups in the terminal and side chains), vinyl chloride-vinyl acetate copolymers, vinyl chloride-vinyl acetate-acrylic copolymers, chlorinated propylene resins, nitrocellulose resins (nitrocellulose), cellulose acetate resins, and fluorine resins, and these can be used individually or in combination of two or more.

Examples of the particles contained in the heaping layer 120 include organic fillers made of resin particles such as acrylic resins, urethane resins, nylon resins, polypropylene resins, and urea resins. Acrylic resins are particularly preferable from the viewpoint of good heat resistance and easy maintenance of the height after the baking process.

Considering the tactile sensation and resistance of the heaping layer (difficulty in falling off of the particles), the particle size of the particles 124 is preferably 5 µm to 60 µm. In the present description, the particle sizes of various particles are 50% particle sizes (d50: median diameters) when the particle size distribution measured by the dynamic light scattering method is expressed by volume cumulative distribution.

In addition, considering the tactile sensation, the content of the particles is preferably 10 parts by mass or more, more preferably 20 parts by mass or more, further more preferably 30 parts by mass or more, with respect to 100 parts by mass of the binder resin constituting the projection regions 122. Meanwhile, for reliably bonding the particles with the binder resin to suppress falling off and improving the fluidity of the resin composition to facilitate the forming process, the content of the particles is preferably 50 parts by mass or less, more preferably 40 parts by mass or less, further preferably 30 parts by mass or less, with respect to 100 parts by mass of the binder resin.

The heaping layer 120 may further comprise an inorganic filler. Examples of the inorganic filler include silica, clay, heavy calcium carbonate, light calcium carbonate, precipitated barium sulfate, calcium silicate, and synthetic silicate. The size of the inorganic filler is preferably 1 µm or more and 20 µm or less, more preferably 3 µm or more and 10 µm or less, further preferably 3 µm or more and 7 µm or less.

The content of the inorganic filler is preferably 5 part by mass or more and 40 parts by mass or less, more preferably 10 parts by mass or more and 30 parts by mass or less, further preferably 15 parts by mass or more and 25 parts by mass or less, with respect to 100 parts by mass of the binder resin.

In this way, the gloss difference between the region where the heaping layer 120 is formed and the region where the heaping layer 120 is not formed can be increased to facilitate imparting a luxury design to the decorative material by containing the inorganic filler.

The heaping layer 120 may further contain bright particles. Examples of the bright particles include metallic pigments, pearl pigments, glass flakes, phosphorescent pigments, gold dust, hologram glitters, and combinations thereof.

The heaping layer 120 preferably contains a weathering agent such as an ultraviolet absorber and a light stabilizer in view of improving the weather resistance.

The average thickness of the heaping layer 120 is not particularly limited, and may be appropriately set according to the tactile sensation and visual effect required for the decorative material. The thickness of the heaping layer 120 is preferably 5 µm to 60 µm, more preferably 15 µm to 45 µm, even more preferably 25 µm to 35 µm.

<Protective Layer>

The protective layer 110 is formed on the bright pattern layer 108, as required. When the decorative material has the heaping layer 120, the protective layer 110 is preferably formed between the bright pattern layer 108 and the heaping layer 120. The protective layer serves to protect the bright pattern layer 108, for example. In addition, the protective layer 110 serves to improve adhesion between the bright pattern layer 108 and the heaping layer 120. The protective layer 110 may be provided on the entire surface of the base material 102 when viewed from the front side or may be partially provided.

An ink (ink for protective layers) containing a material constituting a protective layer is used for forming the protective layer 110, for example.

Examples of materials constituting the protective layer include resins. The ink for protective layers may appropriately contain a solvent.

Preferable examples of the resin include resins such as urethane resins, acrylic polyol resins, acrylic resins, polyester resins, alkyd resins, amide resins, butyral resins, styrene resins, urethane-acrylic copolymers, vinyl chloride-vinyl acetate copolymers, vinyl chloride-vinyl acetate-acrylic copolymers, nitrocellulose (nitrocellulose), cellulose acetate, and fluorine resins. Further, curable resins such as a two-component curable urethane resin containing polyol as a base resin and isocyanate as a curing agent may be used, for example. These can be used individually or in combination of two or more.

The protective layer 110 preferably has higher gloss than the heaping layer 120, for improving the visual effect (gloss/matte effect) due to the gloss difference from the heaping layer 120. The protective layer 110 preferably contains a matting agent, as required.

Examples of the matting agent include inorganic fillers made of particles such as silica, clay, heavy calcium carbonate, light calcium carbonate, precipitated barium sulfate, calcium silicate, synthetic silicate, and silicic acid fine powder. The volume-average particle size of the matting agent is preferably 1 µm or more and 20 µm or less, more preferably 3 µm or more and 10 µm or less, further preferably 5 µm or more and 7 µm or less.

Further, the content of the matting agent with respect to 100 parts by mass of the binder resin in the protective layer 110 is preferably 5 part by mass or more, more preferably 10 parts by mass or more, further more preferably 20 parts by mass or more, and the upper limit is generally 100 parts by mass or less, preferably 80 parts by mass or less, more preferably 50 parts by mass or less, further more preferably 30 parts by mass or less. The content of the matting agent falling within such a range enables an excellent visual effect (gloss/matte effect) to be obtained.

The protective layer 110 may contain a weathering agent such as an ultraviolet absorber and a light stabilizer in view of improving the weather resistance.

The thickness of the protective layer 110 may be appropriately selected according to the desired pattern. The protective layer 110 is preferably 2 µm or more, more preferably 4 µm or more, further preferably 6 µm or more. Further, the upper limit of the thickness is preferably 20 µm or less, more preferably 15 µm or less, further preferably 10 µm or less.

<Surface Coating Layer>

The surface coating layer 112 may be formed on the outermost surface of the decorative material 100, as required, for improving resistance such as weather resistance, scratch resistance, abrasion resistance, and stain resistance. The surface coating layer can be omitted if the desired resistance is exhibited even when the heaping layer 120 is exposed on the outermost surface.

An ink (ink for surface coating layers) containing a material constituting a surface coating layer is used for forming the surface coating layer 112, for example.

Examples of materials constituting the surface coating layer include resins. The ink for surface coating layers may appropriately contain a solvent.

The resin to be used for forming the surface coating layer 112 is not particularly limited. Examples thereof include thermoplastic resins such as (meth)acrylic resins, polyurethane resins, polyester resins, polyamide resins, (meth) acrylic acid ester-olefin copolymer resins, vinyl chloride-vinyl acetate copolymers, ethylene-vinyl acetate copolymers (EVA resins), ionomer resins, and olefin-α olefin copolymer; epoxy resins, phenolic resins, urea resins, unsaturated polyester resins, melamine resins, alkyd resins, polyimide resins, silicone resins, hydroxy functional acrylic resins, carboxy functional acrylic resins, amide functional copolymers, urethane resins, and fluororesins. These resins may be used individually or in combination of two or more.

The surface coating layer 112 may contain various additives according to the desired physical properties. Examples of the additives include weather resistance improvers such as ultraviolet absorbers (e.g., benzotriazole ultraviolet absorbers and triazine ultraviolet absorbers), light stabilizers (e.g., hindered amine radical scavengers), abrasion resistance improvers (e.g., particles of silica, alumina, and kaolinite), polymerization inhibitors, infrared absorbers, defoamers, and fillers.

The surface coating layer 112 may or may not contain a matting agent, depending on the required visual effect. When a matting agent is contained, a decorative material with a matte feeling can be obtained. When the matting agent is not contained, color development by the bright pigment in the bright pattern layer can be emphasized. In addition, even when a heaping layer is provided, the surface coating layer 112 can be blended with a matting agent as necessary.

Examples of the matting agent include inorganic fillers made of particles such as silica, clay, heavy calcium carbonate, light calcium carbonate, precipitated barium sulfate, calcium silicate, synthetic silicate, and silicic acid fine powder. The particle size of the matting agent is preferably 1 μm or more and 20 μm or less, more preferably 3 μm or more and 10 μm or less, further preferably 5 μm or more and 7 μm or less. The particle size of the matting agent in the surface coating layer is preferably smaller than the particle size of the particles in the heaping layer.

The thickness of the surface coating layer 112 is not particularly limited, and can be appropriately set according to the application, required specifications, and the like. The surface coating layer 112 is preferably 2 μm or more, more preferably 5 μm or more, further preferably 10 μm or more. Further, the upper limit of the thickness is preferably 30 μm or less, more preferably 25 μm or less, further more preferably 20 μm or less.

The decorative material of the present disclosure can be exemplified by the following laminate structures. The symbol "/" means the boundaries between layers.

(1) Base material/primer layer/base coating layer/bright pattern layer/protective layer/heaping layer/surface coating layer
(2) Base material/primer layer/base coating layer/bright pattern layer/surface coating layer
(3) Base material/primer layer/base coating layer/bright pattern layer/protective layer/heaping layer
(4) Base material/primer layer/base coating layer/bright pattern layer/protective layer
(5) Base material/primer layer/base coating layer/bright pattern layer
(6) Base material/primer layer/bright pattern layer/surface coating layer
(7) Base material/primer layer/bright pattern layer/protective layer
(8) Base material/primer layer/bright pattern layer

[Method of Producing Decorative Material]

The method of producing a decorative material according to the present disclosure is a method of producing a decorative material including a step of forming a bright pattern layer on a base material, wherein
the bright pattern layer has at least a first bright ink layer and a second bright ink layer,
the first bright ink layer and the second bright ink layer satisfy the following relationship (A) or (B),
each of the bright ink layers is provided on at least a part of the base material when the decorative material is viewed in a plan view,
when the decorative material is viewed in a plan view, the first bright ink layer has a region that overlaps and a region that does not overlap with the second bright ink layer, and the second bright ink layer has a region that overlaps and a region that does not overlap with the first bright ink layer.
(A) The first bright ink layer contains a first bright pigment, and the second bright ink layer contains a second bright pigment different from the first bright pigment.
(B) The first bright ink layer and the second bright ink layer contain a bright pigment, and the content ratio of the bright pigment in the first bright ink layer is different from the content ratio of the bright pigment in the second bright ink layer.

In the method of producing a decorative material described above, the bright pattern layer can be formed, for example, by the following methods (i) and (ii).
(i) A step of applying and drying an ink for the first bright ink layer on the base material and a step of applying and drying an ink for the second bright ink layer on the base material.
(ii) A step of transferring a transfer layer of a transfer sheet having the transfer layer including the bright pattern layer on a release layer to the base material.

In the method (i) above, general-purpose methods can be employed as methods for applying and drying the ink for the first bright ink layer and the ink for the second bright ink layer. Examples of the general-purpose application method include gravure printing, offset printing, flexographic printing, letterpress printing, screen printing, and ink jet printing.

When the decorative material has layers other than the bright pattern layer, the layers other than the bright pattern layer can be formed by, for example, applying an ink containing a material constituting each layer to a predetermined location on the base material or on the bright pattern layer and drying the ink.

In the method (ii) above, the bright pattern layer contained in the transfer layer may be formed by, for example, a step of applying and drying an ink for the first bright ink layer on the release layer and a step of applying and drying an ink for the second bright ink layer on the release layer.

In the case where the transfer layer has layers other than the bright pattern layer, the layers other than the bright pattern layer may be formed by, for example, applying an ink containing a material constituting each layer to a predetermined location on the release layer or the bright pattern layer and drying the ink.

In the method (ii) above, the transfer sheet can be peeled off at an interface between the release layer and the transfer layer. The transfer sheet preferably has a release layer and a transfer layer on a support, and is preferably peelable at the interface between the release layer and the transfer layer In the method (ii) above, when the surface of the decorative material has an irregular shape, it is preferable that the surface of the release layer has an irregular shape. By making the surface shape of the release layer an irregular shape, it is possible to give the surface shape of the decorative material a reversed shape of the surface shape of the release layer.

As described above, in the decorative material of the present disclosure, each layer other than the base material can be formed, for example, by general-purpose coating methods.

For example, flow coater coating, roll coating, reverse coating, air spray coating, electrostatic coating, and powder coating can be applied to form the base coating layer. Gravure printing, offset printing, flexographic printing, letterpress printing, screen printing, and on-demand printing such as ink jet printing can be applied to form the bright pattern layer (bright ink layer), the protective layer, and the surface coating layer. Moreover, it is preferable to apply gravure printing to form the heaping layer.

In addition, when a metal base material is used as the base material, after the formation of the outermost layer (the heaping layer or the surface coating layer), a baking step may be performed at a high temperature (for example, temperature of the base material reached, 150° C. to 270° C.).

[Laminate]

The laminate of the present embodiment includes an adherend and the decorative material of the present disclosure laminated on the adherend. The adherend and the decorative material are preferably fixed with an adhesive layer, tacks, or the like.

The adherend can be appropriately selected corresponding to the application of the laminate. Examples of the adherend include metal materials, wood materials, ceramic materials, and resin materials.

[Applications of Decorative Material and Laminate]

The decorative material and laminate of the present disclosure can be used, for example, as a surface decorative board of interior materials or exterior materials.

Examples of the interior materials include surface materials of interior building materials such as walls, floors, and ceilings; surface materials of interior fittings such as partitions, doors, window frames, handrails, surrounding edges, and modular baths; interior materials of vehicles such as cars and electric trains; and surface materials of home appliances.

Examples of the exterior materials include surface materials of exterior building materials such as roofs, walls, floors, balcony blindfolds, space under the eaves, and ceilings; surface materials of exterior fittings such as entrance doors, doors, window frames, handrails, surrounding edges, and moldings; and exterior materials of vehicles such as cars and electric trains.

EXAMPLES

Then, the present disclosure will be described further in detail by way of examples; however, the present disclosure is not limited by these examples at all.

Example 1

An ink for primer layers prescribed as follows was applied onto the entire surface of a steel plate (size: 800 mm×2000 mm, thickness: 0.6 mm) by roll coating so that the film thickness after drying was 2 μm. Thereafter, it was dried at 230° C. (temperature of the base material reached) to form a primer layer.

<Ink for Primer Layers>
  Thermosetting polyester resin
    Solvent (cyclohexanone, propylene glycol monomethyl ether acetate, SWASOL, and naphthalene)
    Solid content: 74%

The ink for base coating layers prescribed as follows was applied onto the entire surface of the primer layer using a curtain flow coater so that the film thickness after drying was 22 μm. Thereafter, it was dried at 180° C. (temperature of the base material reached) to form a base coating layer.

<Ink for Base Coating Layers>
  Thermosetting polyester resin
    Colorants (carbon black, titanium oxide, iron oxide, and yellow iron oxide): 25 parts by mass with respect to 100 parts by mass of the resin
    Solvent (xylene and cyclohexanone)

A first bright ink layer to a third bright ink layer were laminated on the base coating layer (three-layer structure) to form a bright pattern layer. Specifically, the bright ink layers consisting of an aggregate of a plurality of independent regions were formed by gravure offset printing using a plate in which a pattern was engraved so that the cross section of each bright ink layer had the shape shown in FIG. 5. Printing was performed in the order of the first bright ink layer, the second bright ink layer, and the third bright ink layer. The ink for each bright ink layer was applied so as to form a region that overlaps with the other bright ink layers and a region that does not overlap with the other bright ink layers. The film thickness in each independent region of the first bright ink layer, the second bright ink layer, and the third bright ink layer was set to have a film thickness distribution in the range of 0.2 μm to 4 μm.

The inks for the bright ink layers used to form the first bright ink layer to the third bright ink layer are prescribed as follows. The second bright pigment described below is different from the first bright pigment described below. Also, the third bright pigment described below is different from the first bright pigment and the second bright pigment described below.

<Ink for Bright Ink Layers>
  Thermosetting polyester resin (binder resin)
    First bright pigment (pearl pigment) in the ink for the first bright ink layer: "Lumina Exterior Turquoise T303D" manufactured by D-BASF, 7.5 parts by mass of the pearl pigment with respect to 100 parts by mass of the binder resin
    Second bright pigment (pearl pigment) in the ink for the second bright ink layer: "Mearlin Exterior CFS Super Copper 3503Z" manufactured by D-BASF, 5 parts by mass of the pearl pigment with respect to 100 parts by mass of the binder resin
    Third bright pigment (pearl pigment) in the ink for the third bright ink layer: "Lumina Exterior Aqua Blue 7303D" manufactured by D-BASF, 7.5 parts by mass of the pearl pigment with respect to 100 parts by mass of the binder resin
    Solvent (xylene and cyclohexanone)

An ink for protective layers prescribed as follows was applied onto the entire surface of the bright pattern layer by gravure offset printing so that the film thickness after drying was 2 μm.

\<Ink for Protective Layers\>
Thermosetting acrylic resin
Solvent (xylene and cyclohexanone)

An ink for heaping layers prescribed as follows was applied onto the protective layer by gravure printing. The heaping layer was formed so as to overlap with a part of the bright pattern layer. A diagonal digging gravure plate cylinder was used for printing. The gravure plate cylinder used was made by a method in which a photosensitive resist film on the surface of a metal plate material was exposed to a laser beam and then the metal plate material was corroded to form a desired cell pattern. Then, it was dried at 225° C. to form a heaping layer. The average thickness of the heaping layer was 10 μm.

\<Ink for Heaping Layers\>
Thermosetting acrylic resin
Acrylic resin particles (particle diameter 30 μm): 20 parts by mass with respect to 100 parts by mass of binder resin
Silica: 8 parts by mass with respect to 100 parts by mass of binder resin
Colorant (carbon black): 10 parts by mass with respect to 100 parts by mass of binder resin
Solvent (xylene and cyclohexanone)

Comparative Example 1

The decorative material of Comparative Example 1 was obtained in the same manner as in Example 1 except that only the first bright ink layer (containing Lumina Exterior Turquoise T303D manufactured by D-BASF as a bright pigment) was formed on a part of base material as the bright pattern layer.

[Evaluation]

\<Appearance Evaluation\>

Appearance evaluation was performed on the decorative materials of Examples and Comparative Examples.

FIG. 7 is a photograph of the appearance of the decorative material of Example 1. In Example 1, it was possible to express multicolor expression, color concentration difference, and natural gradation by the bright pattern layer (particularly, the portion surrounded by the solid lines in FIG. 7). In addition, a change in brightness was felt when observed at different angles. As a result, it was possible to reproduce the pattern of the real black iron skin. Further, in the decorative material of Example 1, a visual effect (gross matte effect) and a tactile sensation (feeling irregularities) due to the heaping layer were also confirmed.

On the other hand, in the decorative material of Comparative Example 1, although a gloss due to the bright pattern layer was confirmed, it was not possible to express the real visual effect and tactile sensation as in Example 1 because the decorative material was monochromatic.

REFERENCE SIGNS LIST 10, 30, 100: Decorative material
12, 106: Bright pattern layer
14, 34, 102: Base material

The invention claimed is:

1. A decorative material comprising:
a base material; and
a bright pattern layer provided on the base material,
the bright pattern layer comprising a first bright ink layer and a second bright ink layer that satisfy the following relationship (A) or (B):

(A) the first bright ink layer contains a first bright pigment, and the second bright ink layer contains a second bright pigment different from the first bright pigment;
(B) the first bright ink layer and the second bright ink layer contain a bright pigment, and a content of the bright pigment in the first bright ink layer is different from a content of the bright pigment in the second bright ink layer, wherein:
the base material is a metal base material consisting of a metal made of a single metal element or alloy, and
when the decorative material is viewed in a plan view:
each of the bright ink layers is provided on at least a part of the base material, and
the first bright ink layer has a region that overlaps and a region that does not overlap with the second bright ink layer, and the second bright ink layer has a region that overlaps and a region that does not overlap with the first bright ink layer.

2. The decorative material according to claim 1, wherein, when the decorative material is viewed in a plan view, the first bright ink layer is composed of an aggregate of a plurality of independent regions, and when maximum film thicknesses of the respective independent regions are compared, the maximum film thickness of at least one independent region is different from the maximum film thickness of the other independent regions.

3. The decorative material according to claim 1, wherein, when the decorative material is viewed in a plan view, the first bright ink layer is composed of an aggregate of a plurality of independent regions, and at least one or more of the independent regions are partially different in film thickness within the independent regions.

4. The decorative material according to claim 3, wherein one or more of the independent regions of the first bright ink layer have a film thickness distribution in a range of 0.15 μm to 6.0 μm within the independent regions.

5. The decorative material according to claim 1, wherein, when the decorative material is viewed in a plan view, the second bright ink layer is composed of an aggregate of a plurality of independent regions, and when maximum film thicknesses of the respective independent regions are compared, the maximum film thickness of at least one independent region is different from the maximum film thickness of the other independent regions.

6. The decorative material according to claim 1, wherein, when the decorative material is viewed in a plan view, the second bright ink layer is composed of an aggregate of a plurality of independent regions, and at least one or more of the independent regions are partially different in film thickness within the independent regions.

7. The decorative material according to claim 6, wherein one or more of the independent regions of the second bright ink layer have a film thickness distribution in a range of 0.15 μm to 6.0 μm within the independent regions.

8. The decorative material according claim 1, wherein at least one of the film thickness of the first bright ink layer and the film thickness of the second bright ink layer in the region where the first bright ink layer and the second bright ink layer overlap is partially different.

9. The decorative material according to claim 1, wherein the first bright ink layer and the second bright ink layer satisfy the relationship (A), and the first bright pigment and the second bright pigment are different in at least one of reflection characteristics selected from a luminous reflectance Y value, a spectral reflectance, an L* value, an a* value and a b* value.

10. The decorative material according to claim 1, further comprising:
   a base coating layer provided between the base material and the bright pattern layer,
   wherein the base coating layer is a monochromatic or colorless layer.

11. The decorative material according to claim 1, further comprising:
   a heaping layer provided on a part of the bright pattern layer.

12. A laminate comprising an adherend, and the decorative material according to claim 1 that is laminated on the adherend.

13. The decorative material according to claim 11, wherein the heaping layer comprises particles and a binder resin.

14. The decorative material according to claim 1, wherein the first bright ink layer and the second bright ink layer are transparent or translucent.

15. The decorative material according to claim 1, wherein when the decorative material is viewed in a plan view, in the region where the first bright ink layer and the second bright ink layer overlap, the first bright ink layer and the second bright ink layer come into contact with each other in the thickness direction of the decorative material.

* * * * *